United States Patent [19]

Curran

[11] Patent Number: 5,054,875
[45] Date of Patent: Oct. 8, 1991

[54] FIBER-OPTIC EQUALIZER

[75] Inventor: Mark E. Curran, Oceanside, Calif.
[73] Assignee: General Dynamics, San Diego, Calif.
[21] Appl. No.: 561,176
[22] Filed: Aug. 1, 1990
[51] Int. Cl.[5] ............................ G02B 6/26; G02B 6/42
[52] U.S. Cl. ...................................... 385/27; 359/127
[58] Field of Search ...................................... 350/96.15
[56] References Cited

U.S. PATENT DOCUMENTS

| 4,577,924 | 3/1986 | Mathis | 350/96.15 |
| 4,900,116 | 2/1990 | Mathis | 350/96.15 |
| 4,910,539 | 3/1990 | Mathis et al. | 350/96.15 |

Primary Examiner—William L. Sikes
Assistant Examiner—Robert E. Wise
Attorney, Agent, or Firm—Brown, Martin, Haller & McClain

[57] ABSTRACT

A multi-mode optical fiber segment having partially reflecting mirrors on each end functions as a resonant cavity with respect to the modulation frequency when the length of the fiber is equal to one-half the modulation wavelength of the light injected into the fiber. Modulated light is injected through a hole in the mirror at one end, either from a fiber, a waveguide, or directly from a laser diode. The core diameter of the cavity fiber is limited only by the requirement that it must be much larger than the input hole. Light exits though a hole in the mirror opposite the input hole. Upon entry into the resonant cavity, light is subject to multi-modal propagation resulting in dispersion. The resultant output light of the fiber is lower overall in intensity, but its useful frequency response is expanded by the bandpass half-skirt of the fiber-optic filter.

6 Claims, 1 Drawing Sheet

FIBER-OPTIC EQUALIZER

BACKGROUND OF THE INVENTION

I. Field of the Invention

This invention relates generally to RF filters and more particularly to optical RF equalizers.

II. Background Art

The linear response of devices used in communications systems, data links and related electrical networks is often required to exceed the device's roll-off range. With electrical components, electrical equalization can be used to compensate for the tilt by driving the device with a lower voltage at lower frequencies and higher voltage at higher frequencies. An equalizer is often placed at the input of the devices so that the signal can be varied passively. Thus, the electrical equalizer is essentially a high pass filter.

Frequently, laser diodes must be reactively matched to ensure proper drive response, precluding extensive frequency compensation by controlled variation of input voltage. Therefore, a different method of equalizing an optical circuit must be found.

It is known to construct a segment of optical fiber which is resonant to the optical or carrier frequency by placing highly reflective mirrors on both ends of the fiber. A fiber segment so configured may be referred to as a resonant cavity with respect to the carrier frequency. Such a device has advantages such as reduced cost, size and weight, and reduced susceptibility to electromagnetic interference.

It is also known that a multi-mode optical fiber functioning as a resonant cavity may be employed as an RF bandpass filter. U.S. Pat. No. 4,577,924 describes such an optical RF bandpass filter.

It would be desirable to utilize a similar simple structure such as that used in the RF bandpass filter to provide an optical equalizer which can extend the frequency response of the optical system for transmitting RF modulated optical signals. It is to this objective that the present invention is directed.

SUMMARY OF THE INVENTION

It is an advantage of the present invention to provide an optical equalizer based on the modified optical RF bandpass filter which can obtain a linear-optical response beyond the linear portion of the output power curve of a light source.

In an exemplary embodiment, a multi-mode optical fiber segment having partially reflecting mirrors on each end functions as a resonant cavity with respect to the modulation frequency when the length of the fiber is equal to one-half the modulation wavelength of the light injected into the fiber. Modulated light is injected through a hole in the mirror at one end, either from a fiber, a waveguide, or directly from a laser diode. The core diameter of the cavity fiber is limited only by the requirement that it must be much larger than the input hole. Light exits though a hole in the mirror opposite the input hole.

The light which is injected into the fiber-optical equalizer may be modulated coherent or incoherent light. Upon entry into the resonant cavity, light is subject to multi-modal propagation resulting in dispersion. The resultant output light of the fiber is lower overall in intensity, but its useful frequency response is expanded by the bandpass half-skirt of the fiber-optic filter.

BRIEF DESCRIPTION OF THE DRAWINGS

The objects, advantages and features of this invention will be more readily apparent from the following detailed description when read in conjunction with the accompanying drawings, in which.

DETAILED DESCRIPTION OF THE PREFERRED EMBODIMENT

Figure 1:
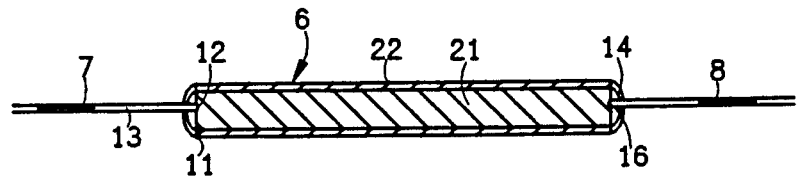
FIG. 1 is a schematic view of the present invention.

As shown in FIG. 1, fiber segment 6 has input light represented by arrow 7 and output represented by arrow 8. The fiber segment is formed with a first end mirror 11 having an axial hole 12 through it. The light is injected into fiber segment 6 by means of an optical source such as a single mode fiber 13, as illustrated, or a waveguide or a laser diode. It should be noted that although the carrier light injected by means of fiber 13 might be coherent, upon passing through hole 12 and mirror 11 and entering multi-mode optical fiber 6, diffraction of the light will occur, resulting in multi-modal propagation of the light within the fiber segment 6. The second end mirror 14 has an axial hole 16 through it to permit output of the equalized optical signal. Both first end mirror 11 and second end mirror 14 are high reflectance dielectric materials deposited on the ends of fiber segment 6.

The fiber segment 6 has a length L corresponding to half the wavelength $\lambda$ of the modulation frequency in that fiber, i.e., $L = c/2nf$ where c is the speed of light in a vacuum, n is the effective refractive index of the fiber, and f is the desired filter center frequency. By making the length of fiber 6 equal to half the modulation wavelength, it is clear that fiber segment 6 functions as a resonant cavity to frequency f.

The core diameter of the fiber 6 is limited only by the requirement that it be much larger than the diameter of input hole 12. The input hole size and shape depends on whether the light is received from a fiber, a waveguide or directly from a laser diode.

Figure 2A:
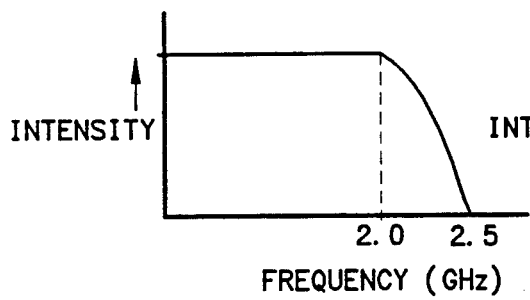
FIG. 2a is a graph of output power versus frequency for a laser diode according to the prior art.
Figure 2C:
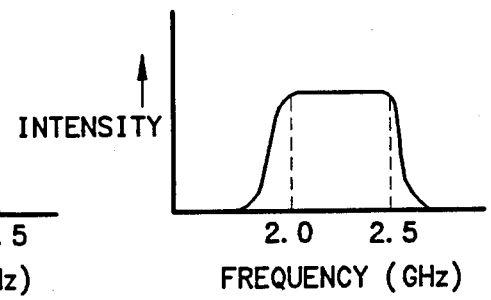
FIG. 2c is a graph of output power versus frequency for a laser diode in conjunction with the present invention.
Figure 2B:
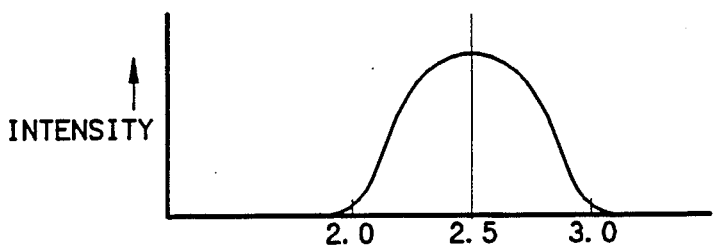
FIG. 2b is a graph of output power versus frequency for an equalizer according to the present invention.

FIG. 2 shows the linear response of a laser diode according to the prior art, FIG. 2a, and according to the present invention, FIG. 2c. FIG. 2b illustrates the frequency response of the equalizer which expands the response range of a laser. Even though the light output of the device is lower, its useful energy response is increased. Note that only the high pass portion of the equalizer is used.

The operation of the fiber-optic equalizer is optically non-coherent and the optical power intensity, rather than the optical electric field or optical phase, is used to carry information. The ability to coherently process received signals is unrelated to the optical non-coherence of the equalizer.

The length L corresponds to the half modulation wavelength $\lambda/2$.

The 3-dB bandwidth, $\Delta f$, is given by $$\Delta f = \frac{f_c(1-A)}{\pi \sqrt{A}} \quad (1)$$

where $$A = R_1 R_2 (1-l) \frac{\sin \omega_c \gamma}{\omega_c \gamma} \quad (2)$$

In the above equations,
$f_c$ is the center modulation frequency,
A is the loss factor,
R1 is the reflectance of mirror M1,
R2 is the reflectance of mirror M2,
l represents the total round trip cavity loss,
$\sin \omega_c Y / \omega_c$ is a dispersion factor in which $$\omega_c \gamma = 2\pi \frac{\Delta}{2 + \Delta} \quad (3)$$

and $$\Delta = \left[ \frac{1}{2} \frac{1}{2} - \frac{(n_2)^2}{n_1} \right] \quad (4)$$

where $n_1$ is the refractive index of fiber core 21, and $n_2$ is the refractive index of fiber cladding 22. The derivation of the dispersion factor assumes that all of the cavity modes contain equal power. This is clearly a worst case situation, because even if all of the modes could be equally excited, only a subset is included in the output. The signal insertion loss $l_T$ in dB is given by $$l_T = -20 \log_{10} \frac{ab}{1-A} \quad (5)$$

where
a is the fraction of light impinging on the output mirror that is collected by the detector, and
b is an input loss factor.

The fiber-optical equalizer response can be linked to conventional filter theory by examining the Laplace transform domain transfer function of an all-pole filter, such as a Butterworth filter, and can be expressed as $$H(s) \left[ = \prod_{i=1}^{N} (s + a_i - j\beta_i) \right]^{-1} \quad (6)$$

where the ordered pair $(a_i, \beta_i)$ are the coordinates of the $i_{th}$ pole in the complex s plane. A partial fraction decomposition of H(s) yields $$H(s) = \sum_{k=1}^{N} \frac{\mu_k e^{j\phi_k}}{(s + a_k - j\beta_k)} \quad (7)$$

where $$\mu_k = \prod_{\substack{i=1 \\ i \neq k}}^{N} [(a_i - a_k)^2 + (\beta_i - \beta_k)^2]^{\frac{1}{2}} \quad (8)$$

and $$\phi_k = \sum_{\substack{i=1 \\ i \neq k}}^{N} \tan^{-1} \frac{(\beta_i - \beta_k)}{(a_i - a_k)} \quad (9)$$

Now a separate fiber-optic equalizer can be associated with each of the terms in the sum in equation (7). The transfer function of the fiber-optic filter can be expressed as $$H(s) = \frac{abe^{-s\tau/2}}{1 - Ae^{-s\tau}} \quad (10)$$

where a, b, and A are defined above and $\tau$ is the round trip time delay in the filter, i.e., $\tau = 1/f_c$. Comparing equation (7) and equation (10) it can be shown that for the $K_{th}$ element $$A_k = \left( \exp - 2\pi \frac{a_k}{\beta_k} \right) \quad (11)$$

and $$\tau = \frac{1}{\beta f_c} \quad (12)$$

combining results, we finally have $$H(s) = \sum_{k=1}^{N} v_k e^{j\theta_k} \frac{a_k b_k e^{-s\tau_k/2}}{1 - A_k e^{-s\tau_k}} \quad (13)$$

where $$V_k = \frac{\mu_k}{a_k b_k} \frac{1}{v_m} \quad (14)$$

in which $V_m$ = the maximum $V_k$ for all k is a normalization constant and $$\theta_k = \phi_k + \frac{\omega_c \tau_k}{2} \quad (15)$$

The s dependence in the numerator of equation (13) distorts the response outside the passband. Within the passband, excellent agreement has been obtained with the expected response.

Figure 3:
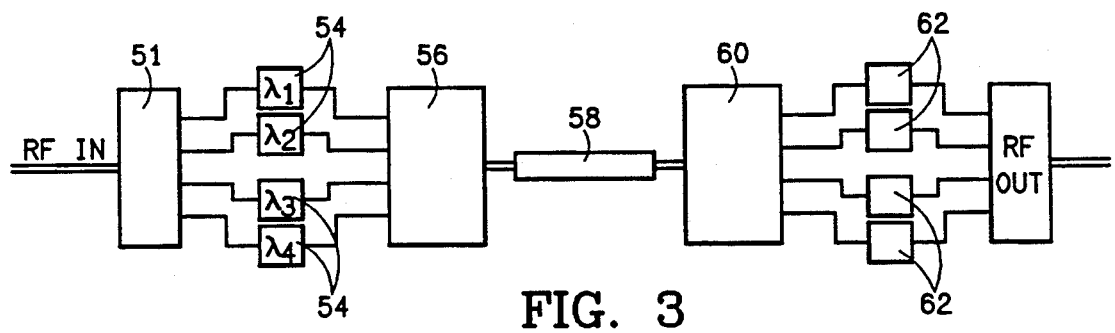
FIG. 3 is a diagrammatic view of a wavelength division multiplexed device with expanded frequency response.

In order to make the optical equalizer a useful device, a large half-skirt of the fiber-optic RF filter is required. It is the high pass portion of the bandpass filter which provides the desired expansion of the frequency response. To make this half-skirt larger, R1 and R2 must be decreased. This can be done by increasing the input/output hole size relative to the diameter of the cavity. The increased relative hole size also increases the attenuation of the fiber-optic filter, resulting in decreased output power. To compensate for the attenuation, two or more similar laser devices with different wavelengths can be used to carry the same RF signal, and the device can be wavelength division multiplexed (WDM) as shown in FIG. 3. The signal is input into RF splitter 51 which splits the RF signal to modulate the output of lasers 54, which is transmitted to a wavelength division multiplexer 56, which may alternatively be a star coupler. Wavelength division multiplexer 56 multiplexes the signals producing a single output which is fed into fiber-optic equalizer 58 to provide expanded frequency response for lasers 54. The output of fiber-optic equalizer 58 is transmitted into a wavelength division demultiplexer 60 which divides the signal into its respective wavelengths and transmits each individual wavelength signal to its appropriate receiver 62. The signals generated by receivers 62 are combined to provide an RF output signal. Using such a configuration permits increased optical power across an expanded frequency response range to be transmitted through the link. The different wavelengths have no effect on filter performance.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method of extending the useful flat frequency response and increasing optical power of an optical device carrying an optical transmission of radio frequency signals which comprises:
    selecting a multi-mode optical fiber segment with a length equal to one-half the wavelength of a predetermined frequency;
    forming a pair of mirrors, one mirror on each end of said fiber segment so that a resonant cavity is formed to resonate light at said predetermined frequency;
    directing light into said fiber segment through a first mirror; and
    emitting light out of said fiber segment through a second mirror so that the emitted light has an extended useful flat frequency response and increased optical power beyond that of a non-equalized optical device.

2. A method as in claim 1 wherein the step of forming a pair of mirrors includes depositing a dielectric material on the respective fiber ends.

3. A method as in claim 1 wherein the step of directing light into said fiber segment comprises injecting light through a first axial hole in said first mirror.

4. A method as in claim 1 wherein the step of emitting light from said fiber segment comprises emitting light through a second axial hole in said second mirror.

5. A method as in claim 1 wherein the step of selecting a multi-mode optical fiber segment includes selecting a length such that the relationship $L=\lambda/2=c/2nf_c$ is satisfied, where $\lambda$ is the modulation wavelength, c is the speed of light, n is the refractive index of said fiber segment and $f_c$ is the desired center frequency.

6. A method of optical transmission of radio frequency signals with extended useful flat frequency response and increased optical power which comprises:
    selecting a multi-mode optical fiber segment with a length equal to one-half the wavelength of a predetermined frequency;
    forming a pair of mirrors, one mirror on each end of said fiber segment so that a resonant cavity is formed to resonate light at said predetermined frequency;
    directing a radio frequency signal into an RF splitter to provide a plurality of radio frequency signals;
    modulating the output light of each of a plurality of optical sources at the frequency of said radio frequency signal, each optical source of said plurality having a different wavelength;
    feeding the modulated output light into a wavelength division multiplexer to produce a single wavelength division multiplexed optical output;
    directing the multiplexed optical output into said fiber segment through a first mirror;
    emitting light out of said fiber segment through a second mirror so that the emitted light has an extended useful flat frequency response beyond that of a non-equalized optical device;
    transmitting output light into a wavelength division demultiplexer to separate light according to wavelength;
    receiving light of each wavelength at a separate receiver corresponding to each wavelength to produce an output radio frequency signal; and
    combining each output radio frequency signal into a single output signal.

* * * * *